Patented Mar. 20, 1934

1,951,772

UNITED STATES PATENT OFFICE 1,951,772

MOLDING POWDER

Kurt Ripper, Berlin, Germany

No Drawing. Original application March 15, 1928, Serial No. 262,052. Divided and this application May 19, 1930, Serial No. 453,874. In Austria March 18, 1927

9 Claims. (Cl. 260—3)

This invention relates to molding powders and a process for making such products.

The present application is a division of my copending application Serial No. 262,052, filed March 15, 1928, patented June 30, 1931, No. 1,812,374, for Molding compositions. This copending application relates to a molding powder comprising a condensation product resulting from the reaction of unaltered dicyandiamide and formaldehyde and especially to a molding powder comprising a mixed condensation product resulting from the reaction of formaldehyde on unaltered dicyandiamide and another compound capable of forming a resinous condensation product with formaldehyde.

In the present invention a composition is rendered available which gives an excellent heat reactive molding powder.

I have found that, if together with dicyandiamide, urea is allowed to react with formaldehyde (in a far less ratio of formaldehyde than would be used if urea alone is allowed to react with formaldehyde for the purpose of obtaining clear condensation products, that is, less formaldehyde than would correspond to 1 mol. of urea to 2 mols. of formaldehyde) not only a perfectly water-clear solution of mixed condensation products, but also a highly hydrophobe resin is formed, which resin when treated with cold water or aqueous solutions disintegrates to a flourlike powder. This powder, upon drying, yields an excellent molding powder.

Also with thiourea there is formed a mixed colloid which is precipitated from a clear solution as a hydrophobe resin. This resin, when treated with water or aqueous solutions is also very easily transformed into a flourlike fine molding powder.

The molding powders referred to above can be produced in any desired degree of fineness by the aid of the simplest technical means; they can be dried very quickly and can be molded by the combined or separate action of heat and pressure, owing to their good flow under heat and pressure.

By pressing these powders, either shaped articles or blocks, plates, and rods for further mechanical treatment can be produced, as the material, formed by hot pressing, very easily can be bored, cut, sawn, turned, polished, etc.

The invention will be more particularly illustrated by the following examples (not exhausting all possibilities of the new process):

1. 100 parts by weight of dicyandiamide together with 71 parts by weight of urea are dissolved in 200 parts by weight of a 40% aqueous formaldehyde (which quantities correspond to a ratio of 1 mol. of dicyandiamide, 1 mol. of urea to 2 mols. of actual formaldehyde) and heated in a reflux boiler for about 2 hours. The mixture remains water-clear. After about this time a specimen by cooling shows the formation of a highly hydrophobe resin which—when again heated—remains absolutely clear.

The reaction mixture is then poured into water and after a short time the transformation of the resin separated into a flourlike powder is finished. After filtering off, washing and drying a molding powder is formed which by the combined action of heat and pressure gives water-clear molded articles.

2. 100 parts by weight of dicyandiamide, 91 parts by weight of thiourea and 200 parts by weight of 40% formaldehyde (by volume) (which quantities correspond to a ratio of 1 mol. dicyandiamide, 1 mol. thiourea, and 2 mols. of formaldehyde) are heated in a reflux boiler for about 1½ hours and the solution is then poured into cold water. Similarly to the products described above, there is formed a fine molding powder which by hot pressing can be molded into water-clear shaped articles.

All these molding powders may be used alone or—owing to their high flowing qualities—mixed with various organic or mineral fillers or extending agents. If desired lubricants and plasticizing agents or fluxes may be added for the purpose of increasing the flow of the molding composition. As fillers, which increase the mechanical strength of the pressed article, there may be used all fibrous substances of mineral or vegetable origin, as e. g. asbestos, cellulose in any form such as cotton-flock, wood pulp, sawdust, wood flour, cork, flax or the like, and finally fillers of animal origin such as wool, silk, leather scrap, etc.

The fillers can be incorporated with the binder before, during or after the step of converting the resin into the state of powder.

The articles pressed from the resin (with or without fillers) can be used industrially for many different purposes, for instance insulating material, as substitutes for glass, milk-white glass, porcelain, fancy articles, articles of trinketry, mechanical work-pieces of all descriptions, and the like. These are only a few examples indicating the very extended applicability of the new products.

Instead of the dicyandiamide, derivatives of the same, as well as its raw aqueous solutions, can be used. And instead of the formaldehyde, its polymers, as well as other aldehydes, can be used. Finally, instead of the substances able to form with aldehydes, resin-like condensation products, also the initial condensation products of these substances with formaldehyde, as well as methylolurea and methylol thiourea, and the like can be used, in which cases the amount of the formaldehyde may be reduced as compared with the above examples.

No catalysts or condensing agents capable of attacking the dicyandiamide are employed, and no condensing agent is necessary to cause the condensation reactions, as indicated in the examples.

What I claim is:

1. A molding powder comprising a mixed condensation product resulting from the reacting with formaldehyde on unaltered dicyandiamide and an amide of the class consisting of urea and thiourea.

2. A molding powder comprising a mixed condensation product resulting from the reacting with formaldehyde on unaltered dicyandiamide and urea.

3. A molding powder comprising a mixed condensation product resulting from the reacting with formaldehyde on unaltered dicyandiamide and thiourea.

4. The process of making a molding powder which comprises producing a mixed condensation product by reacting with formaldehyde under heat upon dicyandiamide and an amide of the class consisting of urea and thiourea, allowing the reaction to progress until a hydrophobe resinous reaction product has been formed which separates from the reaction mixture on cooling, contacting such condensation product with water to undergo conversion into a fine powder, separating such powder from the bulk of the remaining liquid and drying it.

5. The method of making a molding powder which comprises dissolving dicyandiamide together with an amide of the class consisting of urea and thiourea in a watery solution of formaldehyde, heating the so prepared solution until a hydrophobe resinous condensation product has been formed, pouring the whole of the reaction mass into cold water to precipitate the said condensation product and convert it into a fine powder, separating such powder from the bulk of the remaining liquid, and drying it.

6. The method of making a molding powder which comprises dissolving dicyandiamide together with urea in a watery solution of formaldehyde heating the so prepared solution until a hydrophobe resinous condensation product has been formed, pouring the whole of the reaction mass into cold water to precipitate the said condensation product and convert it into a fine powder, separating such powder from the bulk of the remaining liquid, and drying it.

7. A process of the general character defined in claim 3 in which the reaction is started with a solution containing dicyandiamide, an amide of the class consisting of urea and thiourea and formaldehyde in a ratio which corresponds to 1 molecule of dicyandiamide, 1 molecule of the amide of the said class and 2 molecules of formaldehyde.

8. A molding powder obtained by producing a hydrophobe resinous condensation product by reacting with formaldehyde upon unaltered dicyandiamide and an amide of the class consisting of urea and thiourea followed by contacting the so formed resinous condensation product with water to convert the said product into a flourlike fine powder free from electrolytes.

9. A molding powder obtained by producing a hydrophobe resinous condensation product by reacting with formaldehyde upon unaltered dicyandiamide and a urea followed by contacting the so formed resinous condensation product with water to convert the said product into a flourlike fine powder free from electrolytes.

KURT RIPPER.